(12) United States Patent
Daniels, Jr. et al.

(10) Patent No.: US 9,456,587 B2
(45) Date of Patent: Oct. 4, 2016

(54) FISH FEEDER

(71) Applicants: Gary L. Daniels, Jr., Redmond, WA (US); Gary L. Daniels, Monroe, MI (US)

(72) Inventors: Gary L. Daniels, Jr., Redmond, WA (US); Gary L. Daniels, Monroe, MI (US)

( * ) Notice: Subject to any disclaimer, the term of this patent is extended or adjusted under 35 U.S.C. 154(b) by 267 days.

(21) Appl. No.: 14/290,939

(22) Filed: May 29, 2014

(65) Prior Publication Data

US 2015/0342158 A1    Dec. 3, 2015

(51) Int. Cl.
*A01K 61/02*    (2006.01)

(52) U.S. Cl.
CPC .................................. *A01K 61/025* (2013.01)

(58) Field of Classification Search
CPC . A10K 61/02; A10K 61/025; Y10S 426/805
See application file for complete search history.

(56) References Cited

U.S. PATENT DOCUMENTS

| 3,796,812 | A | * | 3/1974 | Baensch | A01K 61/02 426/108 |
| 4,787,165 | A | * | 11/1988 | Cook, Jr. | A01K 91/18 43/27.4 |
| 4,858,362 | A | * | 8/1989 | Cook, Jr. | A01K 91/18 43/27.4 |
| 5,873,326 | A | * | 2/1999 | Davet | A01K 61/025 119/245 |
| 6,363,652 | B1 | * | 4/2002 | Spinelli | A01K 97/02 119/51.04 |
| 6,938,652 | B1 | * | 9/2005 | Harmon, Jr. | A01K 61/025 119/51.04 |

FOREIGN PATENT DOCUMENTS

| GB | 2069801 A | * | 9/1981 | ............. A01K 91/18 |
| KR | 20100074429 A | * | 7/2010 | ............. A01K 63/00 |

* cited by examiner

*Primary Examiner* — Kathleen Alker
(74) *Attorney, Agent, or Firm* — Jelic Patent Services, LLC; Stanley E. Jelic (57) ABSTRACT

A fish feeder configured to feed a rolled sheet of fish food at a predetermined measured rate into a fish tank. The end of the sheet remains perpendicular to and below the water line during feeding, to minimize the amount of air swallowed by the fish.

12 Claims, 11 Drawing Sheets

FISH FEEDER

TECHNICAL FIELD

This disclosure is related to feeding fish living in fish tanks. More particularly, the disclosure discusses a timed, measured approach to feeding an appropriate amount of food to the fish.

BACKGROUND

The statements in this section merely provide background information related to the present disclosure. Accordingly, such statements are not intended to constitute an admission of prior art.

A common problem in maintain fish in fish tanks is malnutrition. One example is Yellow Tang, which is a very common saltwater fish in the hobby. Tang fish are herbivores but often in captivity they're fed too much protein and not enough algae. Flake foods and pellets aren't an appropriate diet for these fish, though unfortunately a very common fish food that is used for them. Malnutrition is one of the causes for a disease called Head and Lateral Line erosion (HLLE) in these fish, and it is a very common problem that keepers of these fish face. If you go to doctors' offices or other public locations with saltwater tanks, you will almost certainly see a Yellow or Blue Tang (aka Dori). These fish will most likely show signs of HLLE, which manifests itself as holes in the coloring around their head and erosion across a line which travels from their face to their tail.

BRIEF SUMMARY OF THE INVENTION

A fish feeder comprises: a cylindrical feed roller configured to unroll and supply a strip of food at a measured rate; a plurality of feed strip guides configured to guide the strip of food to a water surface; a plurality of feed rods with a non-stick outer surface configured to retain the feed at or near the water surface without causing clumping of the food; a controller configured to enable the cylindrical fed roller to unroll and supply the strip of food at the measured rate via a motor and gears, wherein the controller can initiate and stop a pre-determined timed feed cycle; and a housing.

The cylindrical feed roller configured to unroll and supply a strip of food at a measured rate can hold a roll of sushi nori. The sushi nori roll is comprised of strips of sushi nori which are affixed together in series to provide a roll which is typically 20 feet or more in length when unrolled.

The plurality of feed strip guides configured to guide the strip of food to a water surface function to get the strip of sushi nori to the water surface without damaging the integrity of the strip. The guide(s) deliver the strip to the water surface at a roughly perpendicular angle. In one embodiment, the guides further comprise o-ring(s) configured to pull the guides together, with bushings to limit friction between the guides and prevent the o-ring(s) from breaking.

The plurality of feed rods with a non-stick outer surface configured retain the feed at or near the water surface without causing clumping of the food can be cylindrical rods. The rods are configured to minimize the contact area with the strip of food and still allow fish to reach the food. The non-stick surface can be nylon, acrylic, silicone, or the like. In one embodiment, the feed rods have a non-stick outer surface above the water surface and a clear inner surface below the water surface (i.e. the feed rods are not coated with the non-stick outer surface below the water line).

The controller can be a timer with a predetermined time cycle. The time cycle comprises initiation, operational, stop, and non-operational phases. The time cycle enables the strip of food to be fed at a predetermined time, for a predetermined amount of time, at a predetermined rate.

The housing can enable quick release of the cylindrical feed strip guides and feed roller. This allows easy removal of the cylindrical feed strip guides and feed roller to enable maintenance and re-filling the feed roller.

The scope of the invention is defined by the claims, which are incorporated into this section by reference. A more complete understanding of embodiments on the present disclosure will be afforded to those skilled in the art, as well as the realization of additional advantages thereof, by consideration of the following detailed description of one or more embodiments. Reference will be made to the appended sheets of drawings that will first be described briefly.

BRIEF DESCRIPTION OF THE DRAWINGS

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. Accordingly.

DETAILED DESCRIPTION

To combat tang malnutrition and HLLE within the saltwater fish hobby, it has become very common and popular to feed tang fish sushi nori. The unseasoned dried nori used for sushi is made of dried algae sheets, which is the ideal diet for these fish. Given the prevalence of asian markets, asian isles in grocery stores, and sushi shops across the country, it is also a cheap food that is readily available in large quantities. The most common technique for feeding these algae sheets is to hook them on a clip that's attached under-water using a suction cup. Building upon the idea of hanging/clipping the nori in the water, there are hobbyists using bags made of netting rather than a clip, and others attaching it to cubes of acrylic hanging on a fishing line. All of these approaches require either putting your hands in the tank or taking a container or holder out of the tank to put new nori in. This is time consuming and results in messy water drips that have to be cleaned up. These approaches are also not automatable.

The only automated approach to feeding nori today is to chop it into flakes and use an automated flake feeder, which is a very common feeder used in the aquarium hobby. Flakes and small pieces of nori dropped onto the water surface float for a very long time before absorbing enough water to sink. The problem with this approach is that many saltwater tanks use a sump system, where the water flows over an overflow into a smaller tank in the stand or a separate room. Floating foods end-up going over the overflow and down to the sump to rot or be removed by filtration, rather than being eaten by the fish. To combat this there are feeding "rings" which float on the water surface under the auto feeder, preventing the food from going to the overflow. These feeding rings end up collecting rotting food on them and require additional maintenance to keep clean and attached in the correct location. This approach also results in fish gulping at the surface and taking in large amounts of air while eating. Hence, there exists a need to more reliably automate fish feeding.

Nori is typically sold in sheets. It is possible to manually attach nori together using a small amount of water. The wet nori functions as an adhesive. The algae gets a little damp and sticky, and will then stick to itself. In early experiments, the inventor started cutting the algae into strips and sticking it together, making a single strip of algae 20+ feet long. Once dried, the strips stay together and it is feasible to roll up the 20+ feet long strip without it breaking or coming apart. The inventor immediately saw the potential to automate feeding nori by doing this.

One of the early goals of the feeder was to ensure the algae would get below the water line to be eaten by the fish, without floating on the surface and causing the fish to take in large amounts of air trying to get to it. Tang fish are not surface feeding fish, they live on coral reefs and they prefer their food fully submerged in the water.

The first feeder was manual and used a rectangular slot which went below the water surface to keep the nori down. This approach appeared to work well, however after a few hours of being in the water the nori would turn into mush inside of the feeding slot, jamming the mechanism. There were multiple revisions of this approach, various attempts at reducing surface area inside of the slot to prevent jamming. The slot was also not very visually attractive in the tank. Ultimately, the approach was abandoned.

The inventor also tried to use the roller mechanism with no guide into the water at all, however the nori floated on the surface and resulted in the fish taking in large amounts of air when feeding, which wasn't ideal.

The next revision used acrylic rods to guide the nori into the water, the theory being that being so open there would be nothing to jam on. The rods also provided enough support to the sides to direct the nori into the water rather than floating on the surface. These rods in the tank were also more aesthetically pleasing than the slot approach. This worked better, however the wet nori would still stick to the rods occasionally, and being more open and exposed to the water, splashes on the roller mechanism would cause the nori to stick and jam.

Through research and testing, the inventor found that nylon was a good material to use with the wet nori. It is safe to use in the fish tank (not toxic to fish), and the damp nori doesn't stick to it well. The current revision of the feeder uses nylon rollers (feed strip guides) and nylon sleeves over the guide rods just above the water line. The nylon covers on the guide rods stop just above the water line for aesthetics, leaving only the clear acrylic rod submerged in the water to be visible when looking at fish or coral.

Figure 1:
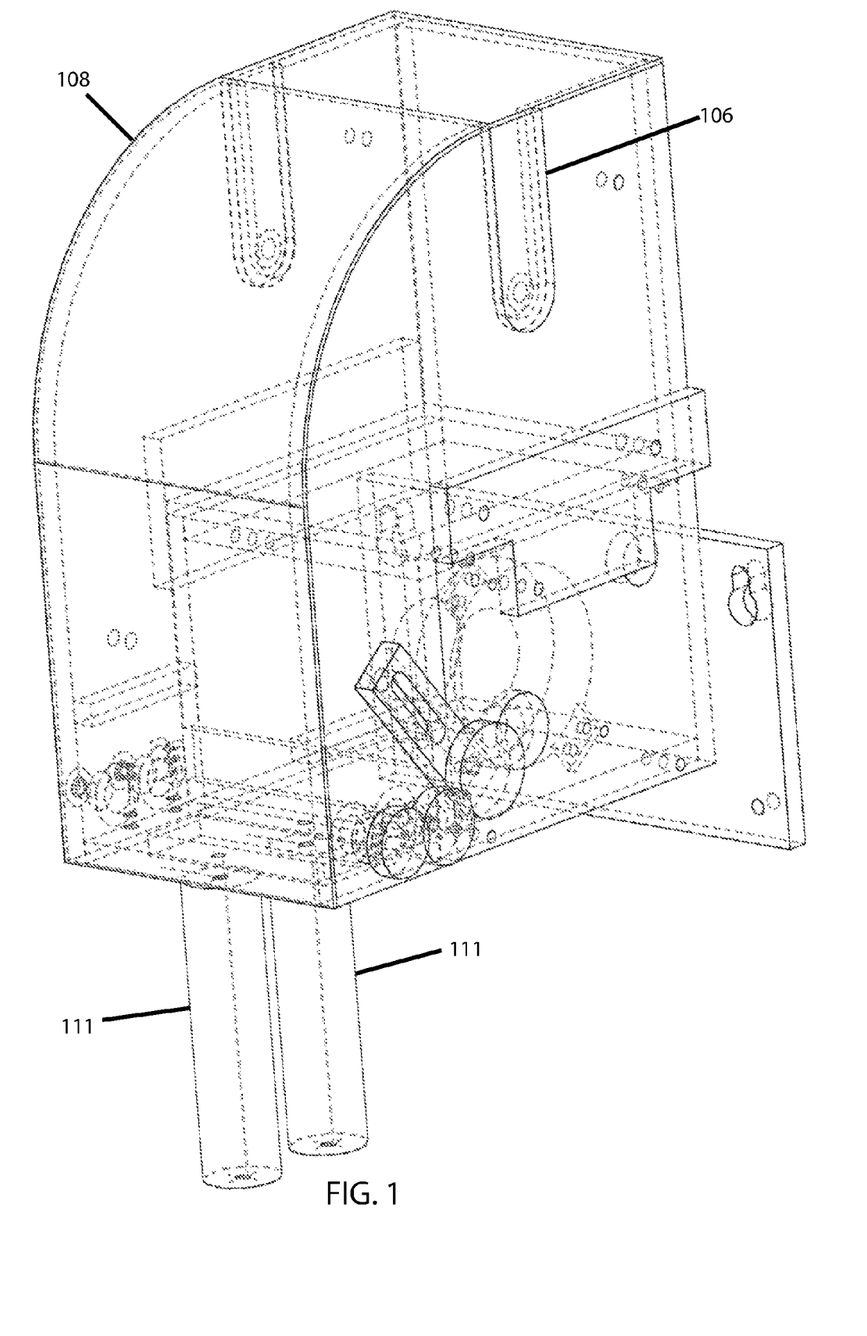
FIG. 1 is a perspective view of an embodiment of the fish feeder.
Figure 2:
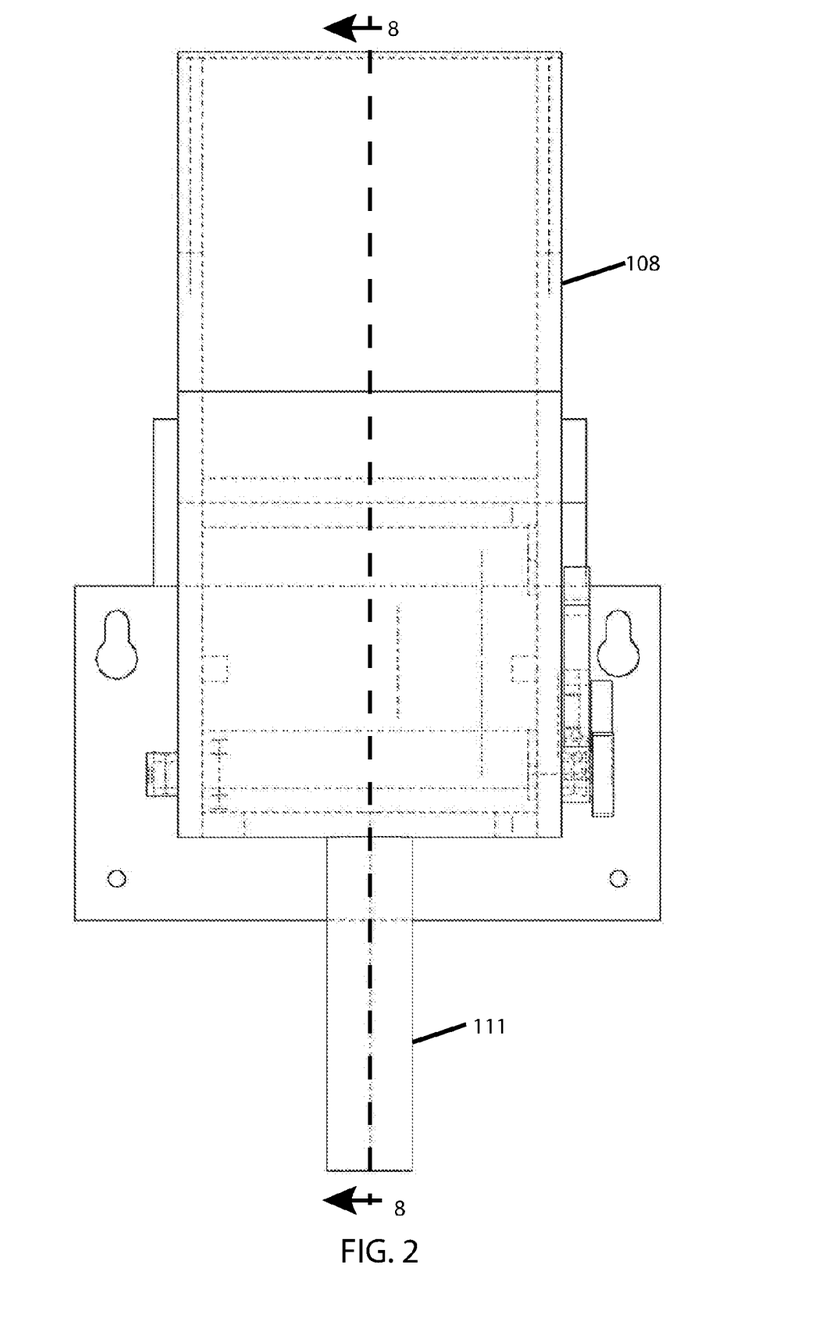
FIG. 2 is a front view of an embodiment of the fish feeder.
Figure 3:
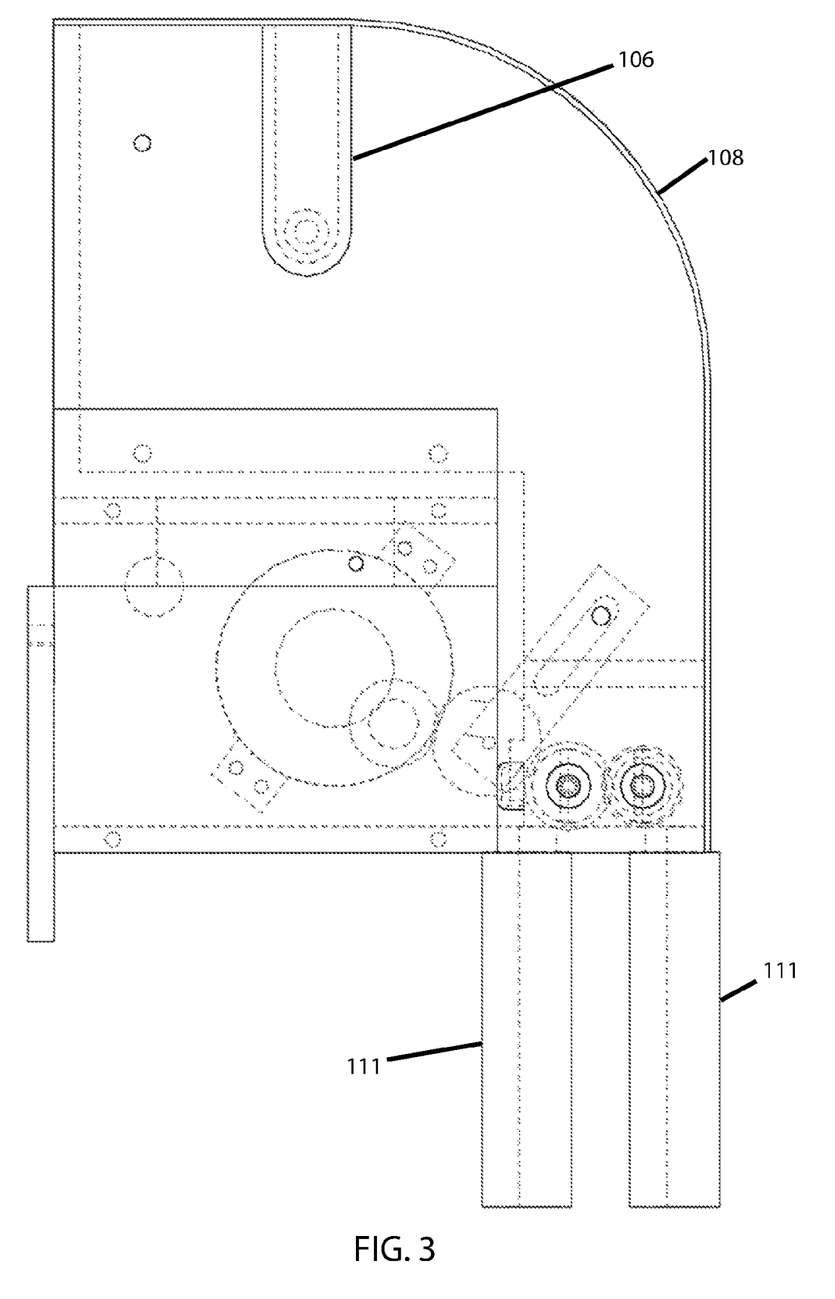
FIG. 3 is a left-side view of an embodiment of the fish feeder.
Figure 4:
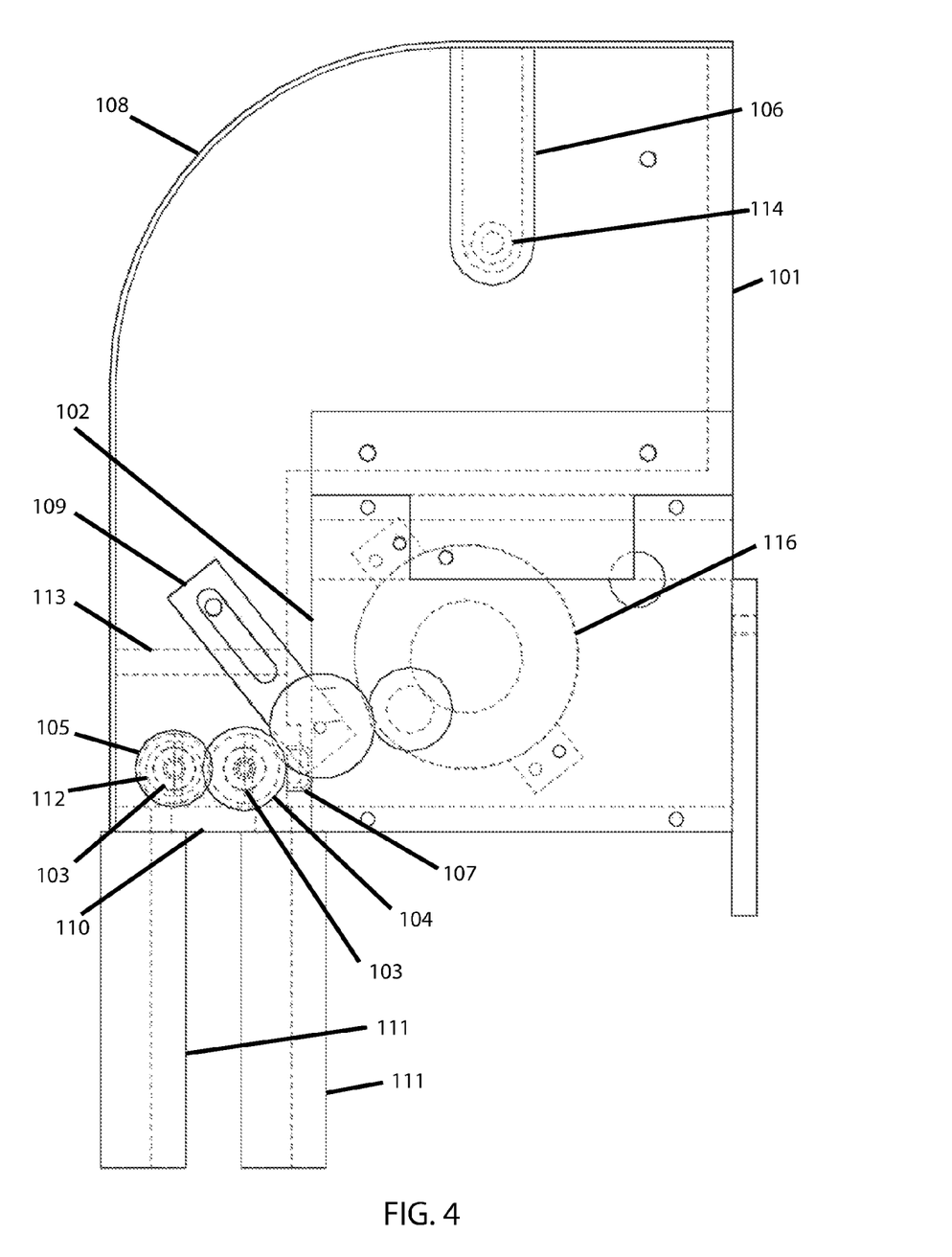
FIG. 4 is a right-side view of an embodiment of the fish feeder.
Figure 5:
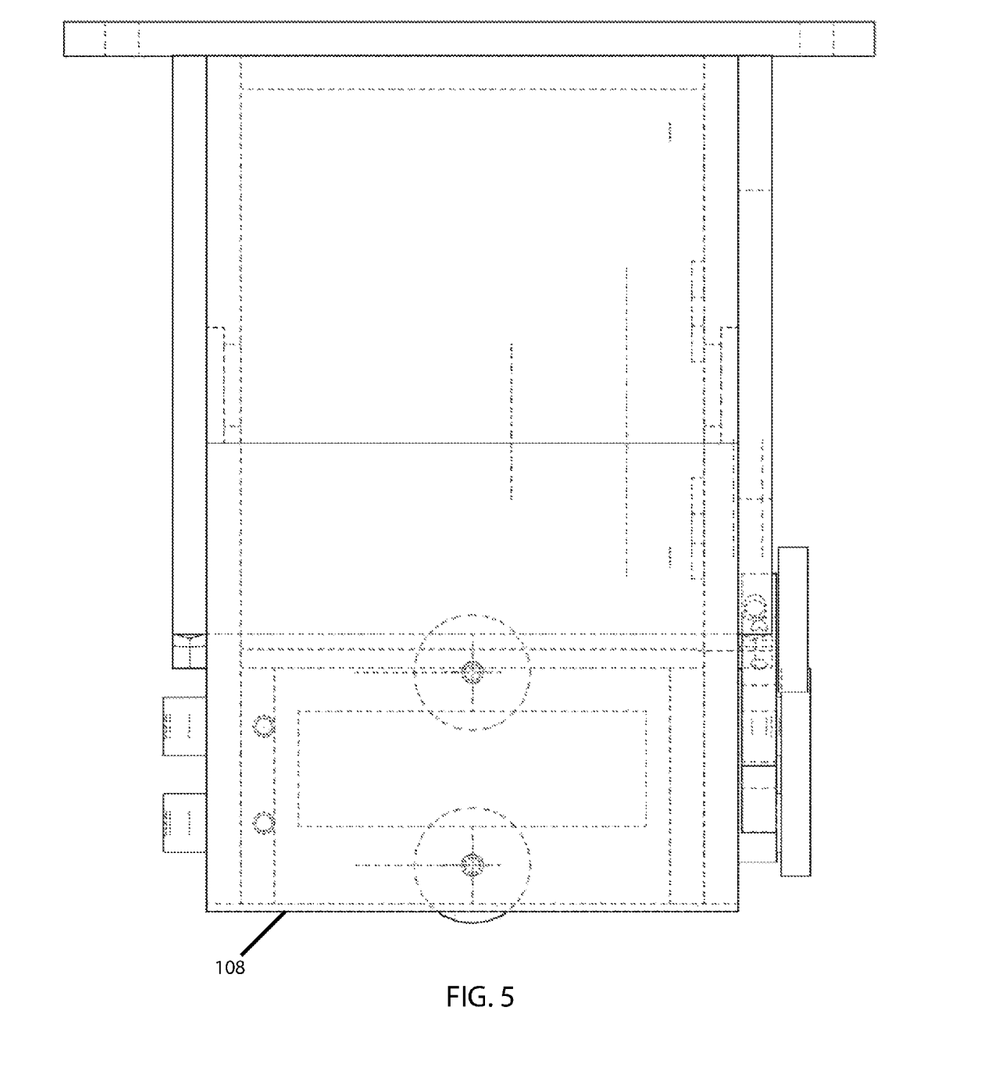
FIG. 5 is a top view of an embodiment of the fish feeder.
Figure 6:
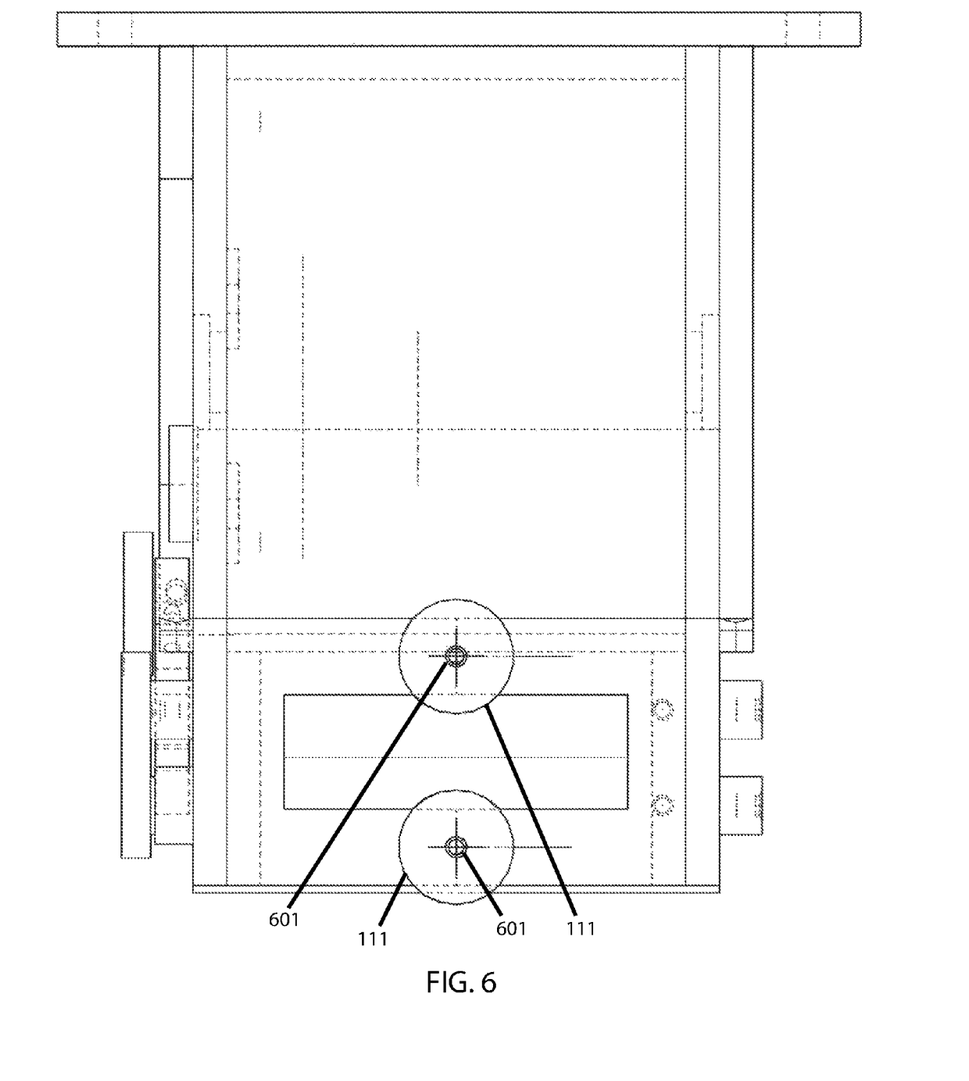
FIG. 6 is a bottom view of an embodiment of the fish feeder.
Figure 7:
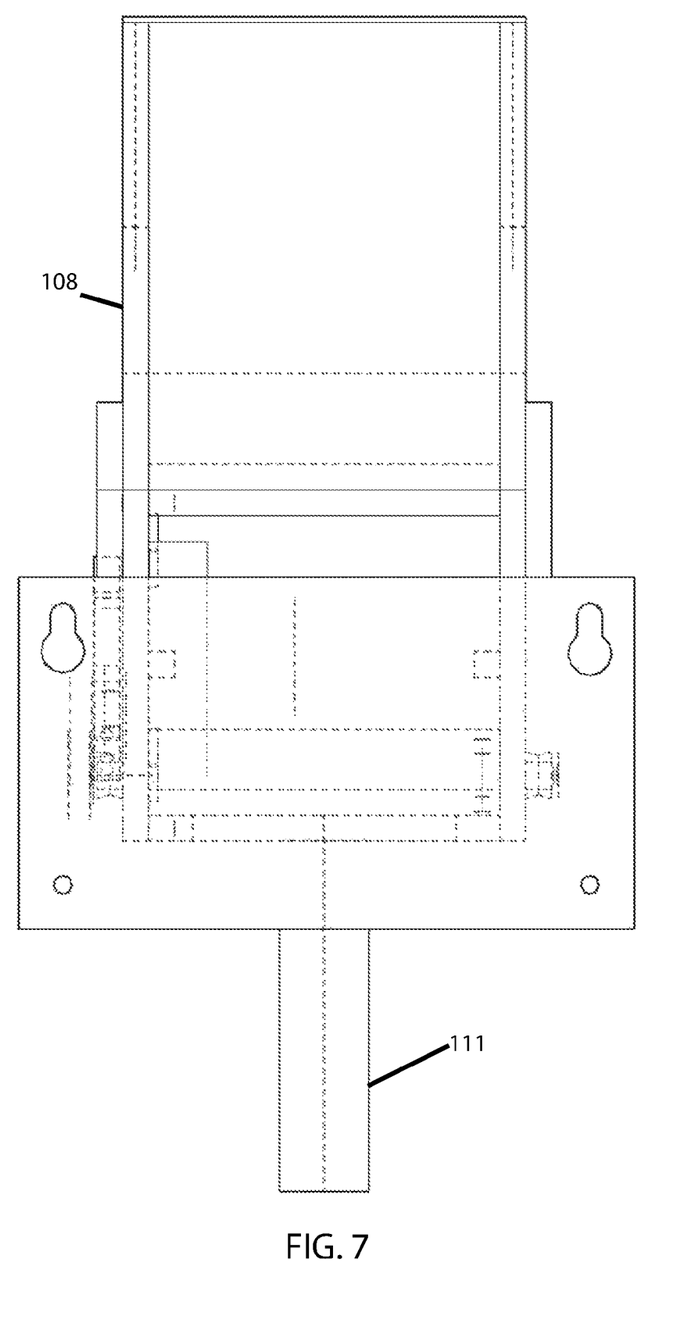
FIG. 7 is a back view of an embodiment of the fish feeder.
Figure 8:
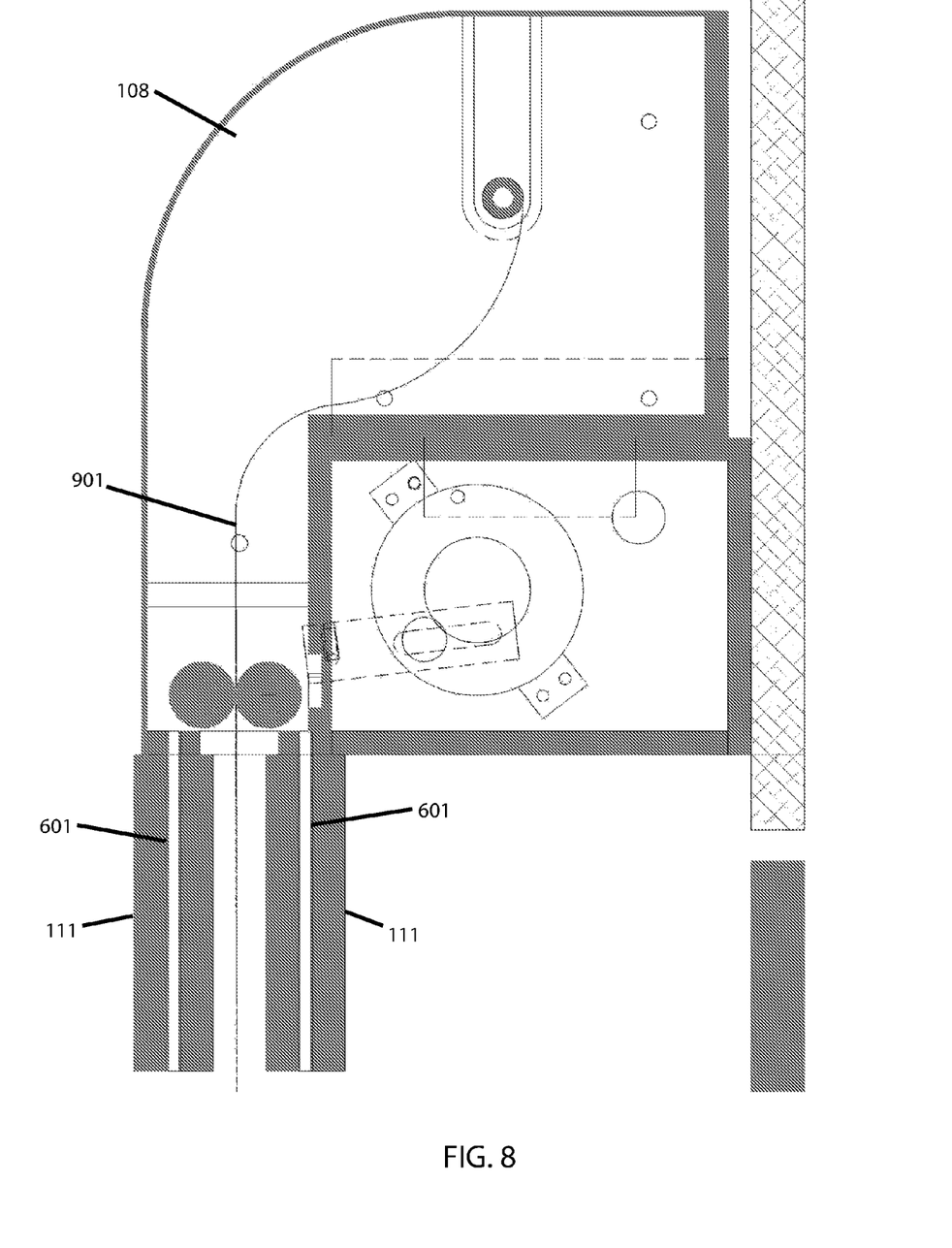
FIG. 8 is a cross-section of an embodiment of the fish feeder.

Another issue the inventor faced was holding the rollers (i.e. the feed strip guides) together to keep the proper pressure on the nori to get it to feed. Complex spring mechanisms didn't seem to be the right approach for the environment (due to salt water corrosion on metallic items). The first embodiment of this used an o-ring in a FIG. 8 shape around the roller shafts, however the inventor found the o-ring had a tendency to break due to rubbing on itself. An effective solution the inventor found is using o-rings as a rubberband pulling the rollers together, with bushings to limit friction and prevent the o-ring from breaking. This works better than the FIG. 8 embodiment because the o-ring isn't rubbing on anything.

Reloading the feeder was also a point of difficulty and, in the inventor's experience, has been a point of difficulty on all automated feeders. Early embodiments of this feeder required removing the whole mechanism to refill, however it's problematic working around the electrical wiring for the motor in a saltwater environment. To solve this problem the inventor split the system into two parts. The motor and electrical is a fixed part which can be mounted and plugged in permanently. The feeder mechanism is easily removable by pulling a pin, to reload and clean without having to touch anything electrical or needing any tools. Also, the motor is low voltage DC for safety.

Because the current embodiment uses an off the shelf timer (assuming 1 minute granularity) and the high torque needed to feed the algae, the whole system is intentionally geared down to be very slow. The slow speed allows the feeder to feed around an inch of algae a minute. This gives the user the ability to do multiple small feedings throughout the day rather than one large feeding. This makes the system compatible with aquarium controllers like the Apex® or ReefKeeper®, but also allows people to use a cheap light timer if they don't have a controller.

Because the nori is food and it is being kept in close proximity to the water for a long period of time, moisture is a concern. To keep the nori as fresh as possible as long as possible, it needs to be kept dry.

The feeder's design keeps the nori isolated from the water by being up high inside the feeder. The seams of the feeder are glued to be water tight, and the gaps around the feeder rollers near the water are made with very tight tolerances to minimize the moisture that gets inside of the feeder. When the inventor used alternative flake feeders in the past, he found that the food would go bad inside of the feeder due to moisture.

Installing the fish feeder: In one embodiment, the fish feeder comes in 2 pieces. The top part holds the algae feed roll and contains the feed rollers, and is designed to be easily removed for routine maintenance and refilling. The bottom contains the motor and electrical plug, and remains affixed for normal maintenance.

When installing, the feed holder (top) requires about 1 inch of space above and forward to allow for removal. Before affixing, confirm that the location of the lights or other obstructions will not interfere with removal and replacement of the feeding mechanism. It is also recommended that the bottom of the feed rollers be no closer than 1.5 inches from the water line. This is to minimize the risk of splashes from the fish causing the nori to wet and stick in the rollers, resulting in added maintenance and reliability issues.

When the mounting location has been determined, hold the bottom of the fish feeder on the wall and locate the pilot holes to mount the drive base on with a pencil or marker. Attach to surface with wood screws, drywall lags, or the like.

Once the base is mounted, plug in the dc power supply and run to the timer (not included). Confirm the feed holder can be removed and reinstalled for filling and maintenance.

Making a feed Roll: Unseasoned and dried (not toasted) Sushi Nori comes in dry sheets which are a little smaller than a sheet of paper. Cut some sheets, with a paper sheet cutter, into strips about 2 inches wide. If a sheet cutter is not available, it is possible to simply fold the nori sheets into quarters lengthwise to get strips approximating 2 inches wide. Fresh dry nori will simply crack and separate at the folds. This method results in jagged edges which are more difficult to line up when attaching the pieces together. A paper sheet cutter, scissors, or ruler with sharp knife, will give a cleaner line and more consistent results.

Wet about ½ of an inch of two strips with a slightly damp sponge or paper towel, this is best done with reverse osmosis water or whatever water you use for top off. Overlap and press the two strips together, while lining the pieces up using a ruler or other straight edge. Repeat the process, working to build up a strip several feet long which remains relatively straight. A strip that is sufficiently curved may "walk" to the edge of the rollers, and jamb the mechanism. It's best to do some test strips, to learn the correct amount of water to use for this. Too much water and the nori will become soft and when dried it will shrink and crumple. Too little water, and the two pieces will separate easily when simply flexing the joint. When done correctly, the two pieces will retain the same width as the rest of the sheet once dried, and the seam will not easily separate by flexing.

Let strip dry, then roll it up on the feed holder pin and install in feed holder assembly, roll the algae through the feed rollers 1 to 2 inches. Replace the lid on the feed holder assembly.

Install the feed holder assembly on the drive assembly and adjust the timer for when and how time you want it to run. The time determines how much algae you feed into the tank. Each minute run will feed approximately 1 inch of Nori into the tank.

An energetic fish may rip off the piece of nori all the way from the water line to the rollers. This does not affect the operation of the unit, the next feed cycle will happen normally. The piece of nori pulled into the water is typically picked at and eaten quickly once floating free in the tank, much like when using nori clips and the fish pull off large pieces.

The straightness of the created nori roll, along with the integrity of the seams, will have a significant effect on the reliability of the feeder. Care needs to be taken to ensure the seams are straight and well bonded for best results.

FIG. 1 through FIG. 11 show the fish feeder embodiments in many different views. The elements shown in the figures are: feeder body 101, motor/support box 102, alignment rollers 103, roller shaft follower 104, roller shaft drive 105, feeder window 106, o-ring support 107, cover 108, idler holder for motor assembly 109, pin support plate 110, feed rods 601 with silicone sleeves 111, bushing for o-ring on follower 112, feed strip guides 113, feed roller 114, controller 115, and motor 116.

Figure 9:
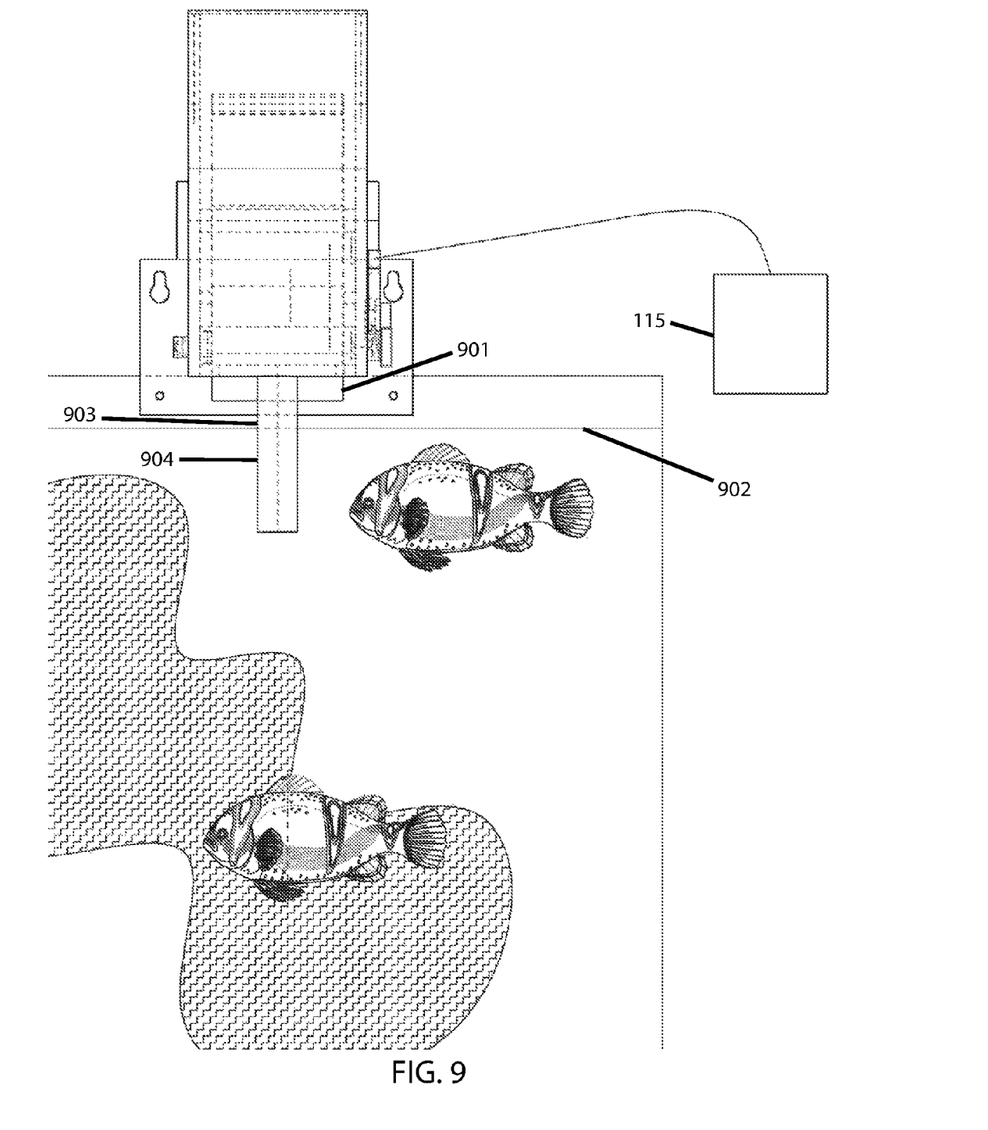
FIG. 9 shows the fish feeder before feedout.

FIG. 9 shows the fish feeder before feedout. The food-strip 901 is substantially above the waterline 902. Also shown is a controller 115, and a feed rod with non-stick outer surface 903 above the waterline 902 and a transparent material of construction 904 below the waterline 902.

Figure 10:
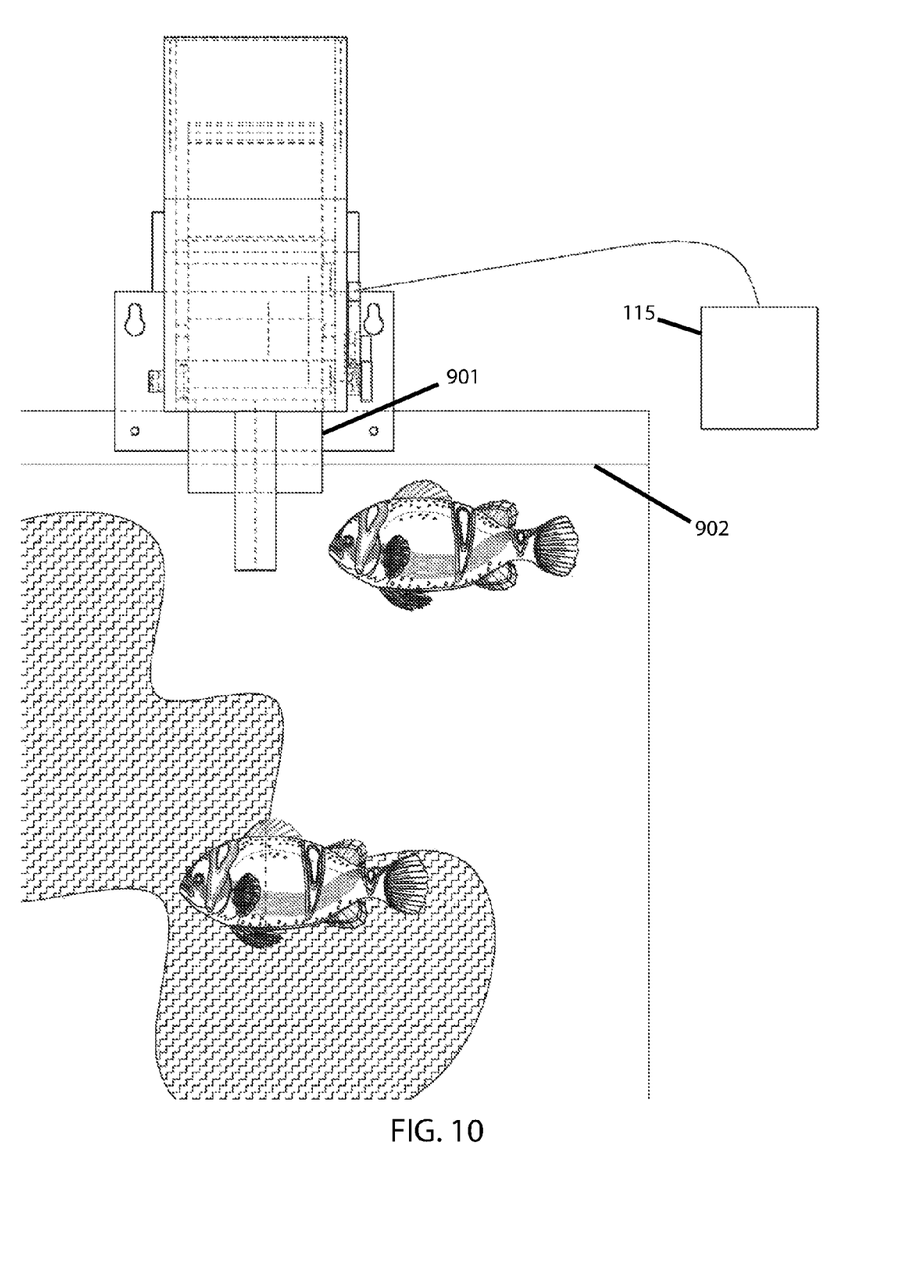
FIG. 10 shows the fish feeder during feedout.

FIG. 10 shows the fish feeder during feedout. The food-strip 901 is near the waterline 902. Also shown is a controller 115.

Figure 11:
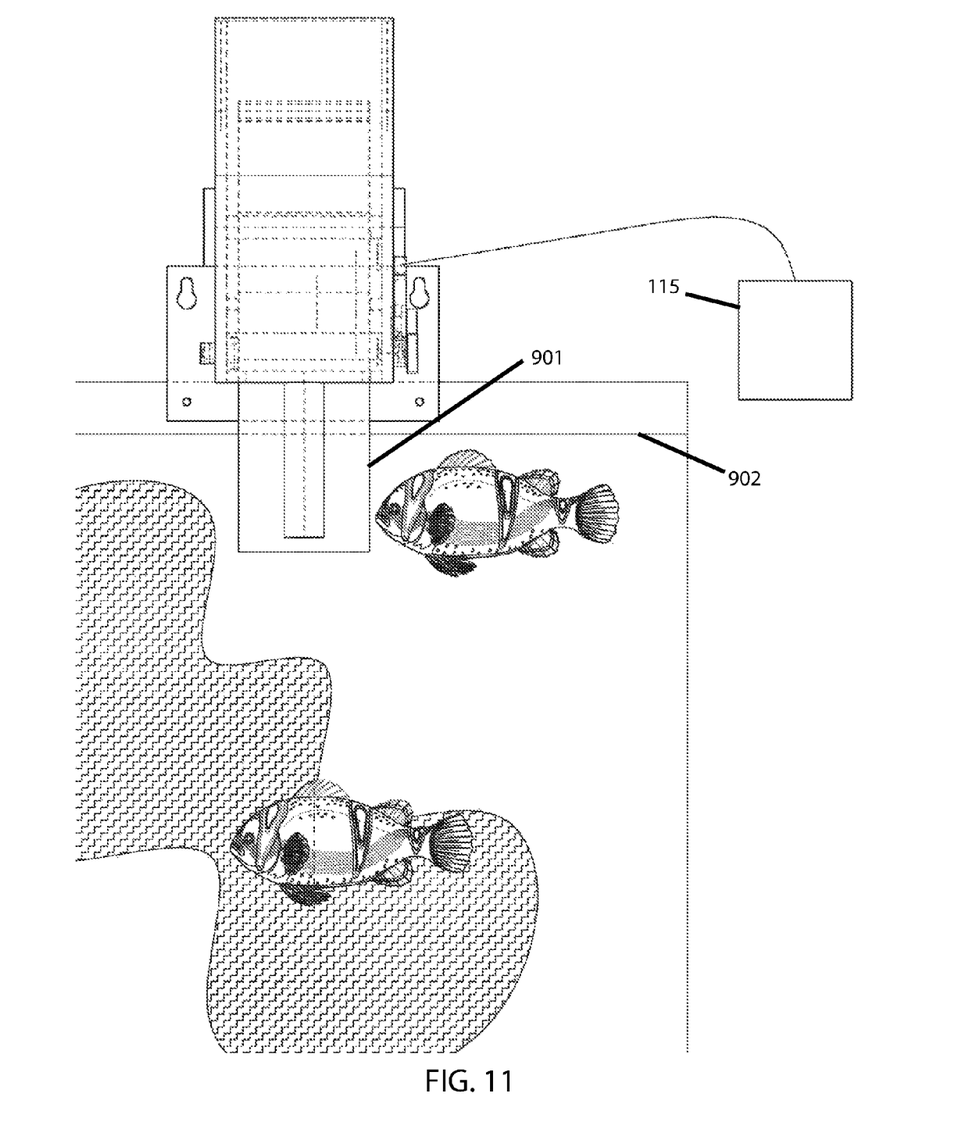
FIG. 11 shows the fish feeder after feedout.

FIG. 11 shows the fish feeder after feedout. The food-strip 901 is substantially below the waterline 902. Also shown is a controller 115.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations, and broad equivalent arrangements.

We claim:

1. A fish feeder apparatus comprising:
   a cylindrical feed roller configured to unroll and supply a strip of food at a measured rate;
   a plurality of feed strip guides configured to guide the strip of food to a water surface;
   a plurality of feed rods with a non-stick outer surface configured to retain the feed at or near the water surface without causing clumping of the food, wherein the feed rods have the non-stick outer surface above the water surface and a transparent material of construction below the water surface;
   a controller configured to enable the cylindrical feed roller to unroll and supply the strip of food at the measured rate via a motor, wherein the controller can initiate and stop a pre-determined timed feed cycle, and
   a housing which holds the cylindrical feed roller and feed strip guides, and is attached to the feed rods.

2. The apparatus of claim 1, wherein the apparatus is further configured to guide the strip of food below the water surface to an extent that it substantially mitigates a problem of a fish gulping air.

3. The apparatus of claim 1, wherein the strip of food consists of sushi nori.

4. The apparatus of claim 1, wherein the non-stick outer surface of the feed rods consists of nylon.

5. The apparatus of claim 1, wherein the feed rod transparent material of construction below the water surface is acrylic.

6. The apparatus of claim 1, wherein the controller allows for a continuous feed capability at a rate slow enough to avoid overfeeding a fish.

7. A method comprising:
   providing the apparatus of claim 1,
   installing a roll of sushi nori into the cylindrical feed roller;
   setting the pre-determined timed feed cycle of the controller;
   supplying power to the apparatus, which enables both the feed roller and the controller to operate.

8. The method of claim 7, wherein the apparatus is further configured to guide the strip of food below the water surface to an extent that it substantially mitigates a problem of a fish gulping air.

9. The method of claim 7, wherein the strip of food consists of sushi nori.

10. The method of claim 7, wherein the non-stick outer surface of the feed rods consists of nylon.

11. The method of claim 7, wherein the feed rods extend below the water surface and the material of construction below the water surface is transparent acrylic.

12. The method of claim 7, wherein the controller allows for a continuous feed capability at a rate slow enough to avoid overfeeding a fish.

* * * * *